(12) United States Patent  
Kohler

(10) Patent No.: US 10,119,504 B2
(45) Date of Patent: Nov. 6, 2018

(54) COUPLING DEVICE FOR A FRESH AIR SYSTEM

(71) Applicant: Mahle International GmbH, Stuttgart (DE)

(72) Inventor: Samuel Kohler, Weil im Schoenbuch (DE)

(73) Assignee: Mahle International GmbH (DE)

( * ) Notice: Subject to any disclaimer, the term of this patent is extended or adjusted under 35 U.S.C. 154(b) by 685 days.

(21) Appl. No.: 14/434,761

(22) PCT Filed: Aug. 14, 2013

(86) PCT No.: PCT/EP2013/067017
§ 371 (c)(1),
(2) Date: Apr. 9, 2015

(87) PCT Pub. No.: WO2014/056652
PCT Pub. Date: Apr. 17, 2014

(65) Prior Publication Data
US 2015/0226162 A1    Aug. 13, 2015

(30) Foreign Application Priority Data
Oct. 10, 2012  (DE) .......................... 10 2012 218 480

(51) Int. Cl.
*F02M 35/10* (2006.01)
*F16L 37/113* (2006.01)
*F16L 21/08* (2006.01)

(52) U.S. Cl.
CPC ....... *F02M 35/10144* (2013.01); *F16L 21/08* (2013.01); *F16L 37/113* (2013.01); *F02M 35/10222* (2013.01); *Y10T 137/9029* (2015.04)

(58) Field of Classification Search
CPC .. F16L 37/113; F16L 21/08; F02M 35/10144; F02M 35/10222; Y10T 137/9029
(Continued)

(56) References Cited

U.S. PATENT DOCUMENTS 2,377,740 A    6/1945  Alford
3,334,661 A *  8/1967  Milette ................. F16L 37/113
                                                285/362 X
(Continued)

FOREIGN PATENT DOCUMENTS

AT        508669 A4    3/2011
CN      101040114      9/2007
(Continued)

OTHER PUBLICATIONS

English abstract for AT-508669.
(Continued)

*Primary Examiner* — Greg Binda
*Assistant Examiner* — Zachary T Dragicevich
(74) *Attorney, Agent, or Firm* — Fishman Stewart PLLC

(57) ABSTRACT

A coupling device for connecting at least two fluid-conducting components may include a connector that may have a securing ring. A locking ring may be arranged on the connector and be configured to transition in a circumferential direction between a securing position and a releasing position. The locking ring may include at least one locking element configured to interact with the securing ring. The locking element may be configured resilient in a radial direction. A connecting piece may be configured axially adjustable with respect to the connector and may include an outer securing groove. The locking element may radially engage into the securing groove when the locking ring is in the securing position to secure the connecting piece to the connector in the axial direction.

19 Claims, 6 Drawing Sheets

(58) Field of Classification Search
USPC ......... 285/307, 377, 396, 402, 89, 314–316, 285/362
See application file for complete search history.

(56) References Cited

U.S. PATENT DOCUMENTS

| | | | |
|---|---|---|---|
| 7,566,079 B1* | 7/2009 | Callahan | F16L 37/113 |
| | | | 285/314 |
| 8,857,398 B2 | 10/2014 | Schieszl | |
| 2006/0022460 A1* | 2/2006 | Callahan | F02M 35/10144 |
| 2006/0090725 A1 | 5/2006 | Garvey et al. | |
| 2007/0216161 A1 | 9/2007 | Regener et al. | |
| 2010/0253068 A1* | 10/2010 | Lewcun | F16L 37/113 |
| 2014/0265303 A1* | 9/2014 | Ismert | F16L 37/113 |

FOREIGN PATENT DOCUMENTS

| | | |
|---|---|---|
| DE | 102009057867 A1 | 6/2011 |
| EP | 1207295 A1 | 5/2002 |
| EP | 1835144 A2 | 9/2007 |
| JP | 10-238679 A | 9/1998 |

OTHER PUBLICATIONS

English Abstract for JP 10-238679.
Chinese Office Action for App. No. 201380050092.8 dated Oct. 10, 2015.

* cited by examiner

COUPLING DEVICE FOR A FRESH AIR SYSTEM

CROSS-REFERENCE TO RELATED APPLICATIONS

This application is the National Stage of International Patent Application No. PCT/EP2013/067017, filed Aug. 14, 2013, which claims the benefit of German Patent Application No. 10 2012 218 480.5, filed Oct. 10, 2012, both of which are hereby incorporated by reference in their entirety.

TECHNICAL FIELD

The present invention relates to a coupling device for connecting air lines of a fresh air system for an internal combustion engine, in particular of a motor vehicle. The invention also relates to a fresh air system for an internal combustion engine, in particular of a motor vehicle, which is equipped with at least one such coupling device.

BACKGROUND

A fresh air system for supplying an internal combustion engine with fresh air usually extends from an air inlet opening to a fresh air distributor, which generally has separate outlet openings for a plurality of cylinders of the internal combustion engine. Such a fresh air system generally comprises a plurality of air-conducting components or air lines, such as an air filter and an intake module, as well as various connection lines for guiding the air. The intake module can contain the above-mentioned air distributor. Such an intake module can likewise contain resonance devices and the like. In forced induction internal combustion engines, the fresh air system also contains a charge device, preferably a compressor of a turbocharger, and a charge air cooler. The individual components must be connected to each other in order to be able to guide the fresh air from the inlet to the outlets. When the fresh air system is assembled, components adjoining each other must be fluid-connected to each other. A coupling device of the above-mentioned type, among other things, can be used for this. There is often only a little installation space, in particular in a vehicle, to accommodate the fresh air system, as a result of which the installation of the individual components of the fresh air system is also made more difficult. In particular, situations can arise in which rotation of the components to be connected to each other in a circumferential direction is not possible or only possible in very small angles. In these cases, installation is often only possible in the axial direction. Simple installation when accessibility and visibility of the installation location are reduced is also desirable. Furthermore, such a coupling device must allow a detachable connection of the components involved, for example for maintenance purposes. The detachment of the coupling device must then also be implemented as simply as possible.

A coupling device of the above-described type should therefore be such that it can be connected and detached as simply as possible, to which end substantially only axial relative movements of the components to be connected to each other or separated from each other should be necessary.

SUMMARY

The present invention is concerned with the problem of specifying an improved embodiment for such a coupling device, which in particular is easy to handle and/or inexpensive to produce.

This problem is solved in the present invention by the subject matter of the independent claim(s). Advantageous embodiments form the subject matter of the dependent claims.

The invention is based on the general concept of equipping the coupling device with a connector and with a connecting piece that can be inserted axially into the connector, by means of which a plug-in connection is realised. Detachable locking between the connector and the connecting piece is also provided. To this end, a locking ring is arranged on the connector, which locking ring can be moved in the circumferential direction at least between a securing position and a releasing position. Said locking ring is equipped with at least one locking element, which is arranged in a radially resilient manner on the locking ring. A plurality of such locking elements, which are arranged distributed in the circumferential direction, is however preferably provided on the locking ring. The connector is also equipped with a securing ring, which interacts with the respective locking element to fix the locking ring axially to the connector. The connecting piece has a securing groove on its outer side, into which the respective locking element can radially engage when the connecting piece is inserted into the connector and when the locking ring assumes its securing position. In this case, the connecting piece is secured mechanically by a form fit, by the respective locking element engaging into the securing groove against unintentionally being pulled out of the connector. The securing groove can run all the way round or be formed by groove segments arranged distributed around the circumference. The coupling device presented here can be connected and disconnected particularly simply, since it is designed as an axial plug-in connection with a detachable locking connection. The axially pluggable components, that is, the connector and the connecting piece, can be attached or arranged in a suitable manner on the components of the fresh air system that are to be connected to each other. The connector and the connecting piece can be attached to the respective components in the form of separate parts. An integral configuration or formation of the connector and connecting piece on the respective component of the fresh air system is likewise conceivable. For example, an air line can be formed at one end as a connecting piece or as a connector. The locking ring arranged rotatably on the connector can easily be operated manually to move it between the securing position and the releasing position. This can in particular be done blind, which makes for example disassembly, that is, detachment of the coupling device, easier.

According to an advantageous embodiment, the respective locking element can have a resilient region and a locking nose, the locking nose engaging into the securing groove and being arranged on the locking ring in a radially resilient manner by means of the resilient region when the connecting piece is inserted and the locking ring is in the securing position. The resilience of the locking elements is thus not provided within the locking ring but within the locking elements by means of said resilient region. The rest of the locking ring can be produced comparatively simply and thus inexpensively as a result. Furthermore, the distribution of a plurality of locking elements in the circumferential direction on the locking ring is simplified.

In another embodiment, the connector can have at least one ramp region, which interacts with the respective locking element when the locking ring is moved from the securing position to the releasing position in such a manner that the respective ramp region pushes the respective locking element radially outwards, so that the connecting piece is released from the respective locking element and can be pulled axially out of the connector when the locking ring is in the releasing position. When the locking ring is rotated into the releasing position, the respective ramp region thus causes the respective locking element to be pulled out of the securing groove. This makes detachment of the coupling device extremely simple. If a plurality of locking elements is provided on the locking ring, which is preferably the case, a plurality of ramp regions is also provided, namely one associated ramp region per locking element.

In another embodiment, the connector can have at least one radial locking window, which is delimited axially by the securing ring and into which the respective locking element radially engages. The respective locking element can then engage into the securing groove through the respective locking window when the connecting piece is inserted and the locking ring is in the securing position. Exactly one such locking window is expediently provided per locking element, so that when there is a plurality of locking elements each locking element is assigned one separate locking window. The above-mentioned ramp region can expediently delimit the respective locking window in the rotation direction that transfers the locking ring into the releasing position. The respective locking window produces mechanical and form-fitting axial fixing of the respective locking element to the securing ring and thus of the entire locking ring to the connector. When in the connected state, the connecting piece is thus axially fixed to the connector in a form-fitting manner by means of the respective locking element.

In another embodiment, the connecting piece can have a ramp contour, which precedes the securing groove and interacts with the respective locking element when the connecting piece is inserted, in such a manner that the ramp contour pushes the respective locking element radially outwards when the connecting piece is inserted and the locking ring is moved into its securing position. This design ensures that the connecting piece can be inserted axially into the connector to produce the connection even if the locking ring has been moved into its securing position. This design further ensures that the connecting piece locks automatically with the connector when a predefined insertion depth is reached as the connecting piece is inserted into the connector, since at said predefined insertion depth the locking elements are radially aligned with the securing groove and engage therein, driven by their spring force.

According to another advantageous embodiment, the locking ring can have a radially protruding drive element that can be manually grasped, while at the same time the connector has a radially protruding abutment element that can be manually grasped. The drive element and the abutment element can expediently be arranged adjacently to each other, that is, positioned relatively close to each other. It is also expediently provided for the drive element and the abutment element to be arranged offset to each other in the circumferential direction, at least in the closed position of the locking ring, in such a manner that they must be moved towards each other to move the locking ring into the releasing position. This design allows the locking ring to be handled relatively easily to transfer it to the releasing position. In particular, the locking ring can be brought into the releasing position with one hand. The arrangement of the drive element and abutment element in the securing position and the shape of same are expediently such that they allow operation with two fingers to move the locking ring into its releasing position. For example, the drive element can be driven with a thumb, while at the same time the abutment element can be held with an index finger. In order then to rotate the locking ring into its releasing position, the fitter only has to move his thumb in the direction of his index finger. This can also be done in particular quasi blind and in a location that is difficult to access.

In another embodiment, the locking ring can have a strip-shaped ring body, which has a flat cross section transverse to the circumferential direction and on which the respective locking element is arranged in a resilient manner. Such a ring body is flexible and elastic with the corresponding selection of material, preferably plastic, owing to its flat cross section. In this manner it is for example possible to provide for the connector and the connecting piece to have a cross section through which flow can pass which differs from a circular shape. Round cross sections, such as oval cross sections, elliptical cross sections and egg-shaped cross sections, are preferred. The elastic ring body means that the locking ring can be rotated relative to the connector in order to be able to move it between the securing position and the releasing position, even with non-circular cross sections. The respective locking element adjoins the ring body laterally, that is, axially, as a result of which the elasticity of the ring body is not adversely affected or is only affected a little.

In another embodiment, the connector can have on its outside at least one rotation stop, which interacts with a receptacle formed on the locking ring to limit the mobility of the locking ring between the securing position and the releasing position. It is thereby signalled to the user haptically when the respective position is reached.

According to another particularly advantageous embodiment, the connector can have a separate securing part, which is attached to a main body of the connector and has the securing ring. In contrast to an integral design in one piece, said two-part design of the connector can be produced more easily by means of injection-moulding dies, as a result of which inexpensive production of the connector and of the securing part from plastic is possible. It is also possible in principle to produce the securing part and the connector from different materials, in particular from different plastics, in order to be able to meet different material requirements.

The separate securing part can be made more or less complex in accordance with advantageous developments. It has at least the securing ring. It can optionally also have the respective ramp region. Additionally or alternatively, the securing part can also have the respective locking window. Additionally or alternatively, the securing part can also have the abutment element. Additionally or alternatively, the securing part can also have the rotation stop.

According to another advantageous development, the connector can have on the radial inside a seal receptacle, which accommodates a radial seal, which seals off the inserted connecting piece radially from the connector. Said seal receptacle can be delimited radially and axially on one side by an annular step formed on the main body. Furthermore, said seal receptacle can be delimited axially on the other side by an axial end face of the above-mentioned securing part. This allows the seal receptacle to be injection-moulded without undercuts, since the undercut contours are formed on different components, namely on the main body on one side and on the securing part on the other side. At the same time the introduction of the respective radial seal, which can be designed as an O-ring seal or as a Y-ring seal or as an X-ring seal, is simplified thereby.

In another advantageous development, the securing part can have at least one radially resilient snap hook, which engages radially outwards into a snap window formed on the main body when in the attached state. The securing part thus can be fixed to the main body without additional, separate fastening means. A plurality of such snap hooks is expediently provided, which are arranged distributed in the circumferential direction. A separate snap window is then expediently provided for each snap hook.

In another development, the main body can have an introduction slope for the respective snap hook, which slope pushes the respective snap hook radially inwards when the securing part is inserted axially, as a result of which the attachment of the securing part to the main body is made much simpler. The respective introduction slope can then expediently be arranged offset in the circumferential direction relative to the associated snap window. During attachment to the main body, the securing part must as a result first be inserted axially and then be rotated in the circumferential direction until the respective snap hook can lock radially into the associated snap window. This design has the advantage that an edge that axially delimits the respective snap window in the withdrawal direction of the securing part can have a comparatively large wall thickness in order to allow transmission of a relatively large force between the respective snap hook and the main body.

According to another advantageous development, a plurality of snap hooks arranged distributed in the circumferential direction can be provided, snap hooks that are adjacent in the circumferential direction each being separated from each other by an axial slot. These slots considerably improve the radial resilient mobility of the locking hooks. The slots are also dimensioned in the circumferential direction such that it is easily possible to push all the locking hooks inwards at the same time. In particular, the securing part can be inserted into the main body in such a manner that the adjacent snap hooks do not touch or obstruct each other in the circumferential direction. This simplifies installation.

A fresh air system according to the invention comprises at least two components, via which fresh air is guided during operation of the fresh air system, and at least one coupling device of the above-described type to connect the two components to each other.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
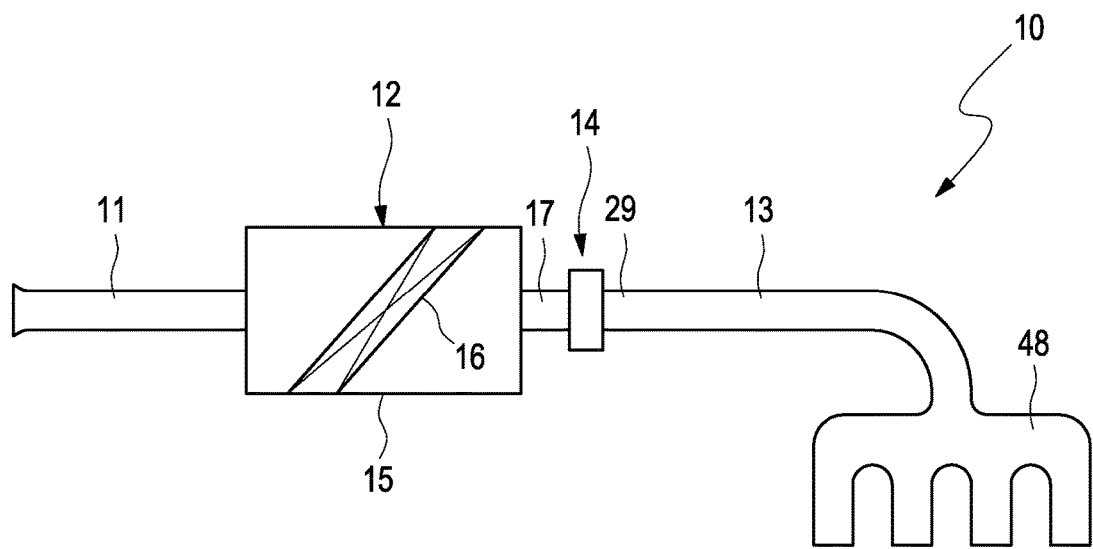
FIG. 1 schematically shows a simplified diagram of a fresh air system for an internal combustion engine, FIG. 2 schematically shows an isometric view of individual parts of a coupling device before assembly, FIG. 3 schematically shows an isometric view of the individual parts of the coupling device in a pre-positioned state, FIG. 4 schematically shows an isometric view of the individual parts of the coupling device in a partially assembled state, FIG. 5 schematically shows an isometric view of the individual parts of the coupling device in a pre-assembled state, FIG. 6 schematically shows an isometric view of the coupling device before assembly, FIG. 7 schematically shows an isometric view of the coupling device in a partially assembled state, FIG. 8 schematically shows an isometric view of the coupling device in an assembled state, FIG. 9 schematically shows an isometric view of the coupling device in a partially disassembled state, FIG. 10 schematically shows an axial section through the coupling device in an exploded diagram, but in a different embodiment, FIG. 11 schematically shows an axial section through the coupling device of FIG. 10 in the assembled state, FIG. 12 schematically shows a partially cut-away, isometric view of the coupling device in another embodiment.
Figure 2:
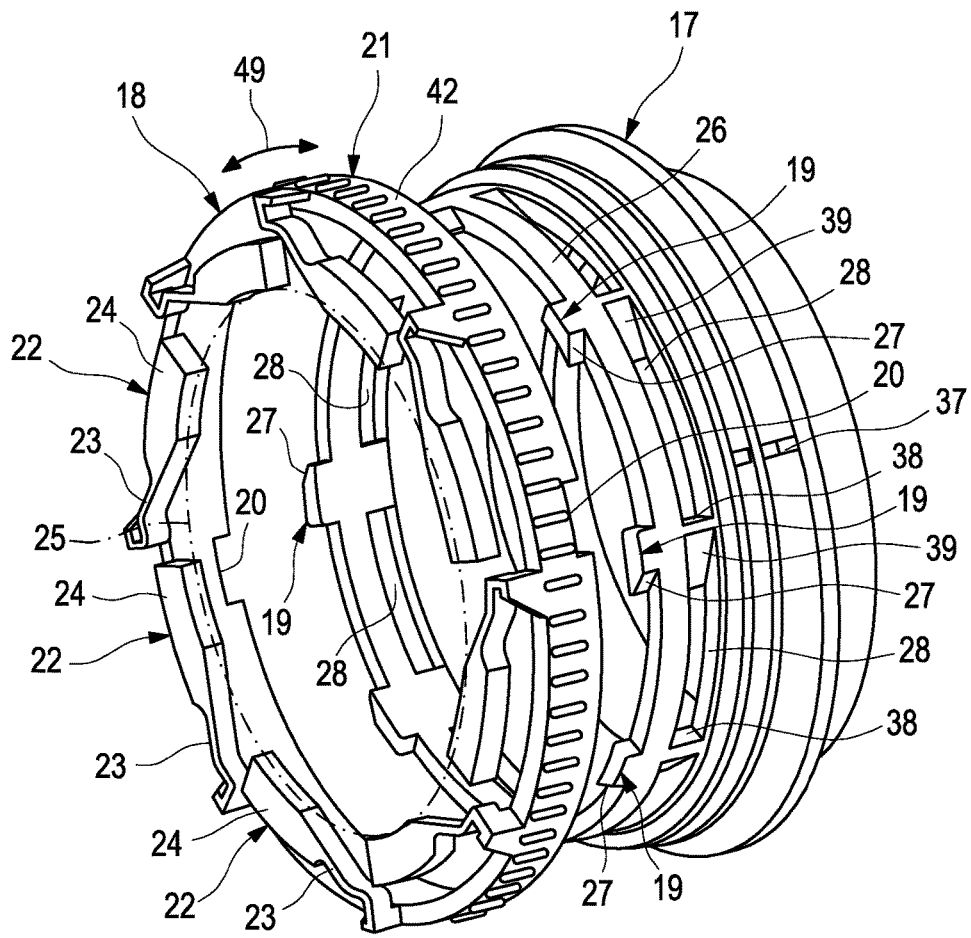

According to FIG. 1, a fresh air system 10 for supplying an internal combustion engine (not shown), which can in particular be arranged in a motor vehicle, comprises an untreated air line 11, a filter device 12 and a clean air line 13, as well as an intake module 48, in this case in the form of a fresh air distributor. In the example shown, the clean air line 13 is connected to the filter device 12 by means of a coupling device 14. In other configurations, the coupling device 14 can also be provided to connect other air-conducting air lines of the fresh air system 10, such as blow-by gas lines, secondary air lines or exhaust gas recirculation lines, to another air-conducting air line. For example, the untreated air line 11 can also be connected to the filter device 12 by means of such a coupling device 14. In general, any two components of the fresh air system 10 can be connected to each other fluidically and mechanically by means of such a coupling device 14.

In the present exemplary embodiment, the filter device 12 has a housing 15 with a filter element 16. A connector 17, which is part of the coupling device 14, is arranged on the housing 15. This connector 17 is permanently connected to the housing 15. The connector 17 can in particular be in one piece with the housing 15. In this case the connector 17 can be formed integrally with a housing 15 formed from plastic. Alternatively, the connector 17 can be connected non-detachably, in particular welded or adhesively bonded, to the housing 15 afterwards. Inside the coupling device 14, the connector 17 interacts with a connecting piece 29, which likewise forms a part of the coupling device 14. In the example of FIG. 1, said connecting piece 29 is connected permanently to the clean air line 13, in particular formed integrally thereon. Alternatively, the connecting piece 29 can also be attached to the clean air line 13 and thus be connected permanently and non-detachably. An inverse arrangement, in which the connecting piece 29 is arranged on the housing 15 and the connector 17 is provided on the clean air line 13, is likewise conceivable.

Details of the coupling device 14 are explained in more detail below using FIGS. 2 to 12. The components of the fresh air system 10 that are to be connected to each other with the aid of the coupling device 14 are not shown or are only shown in the region of the parts that also form parts of the coupling device 14, namely the connecting piece 29 and the connector 17.

The coupling device 14 thus comprises a connector 17, which can be seen in FIGS. 2 to 12, and a connecting piece 29, which is shown in FIGS. 6 to 12 and can be inserted axially into the connector 17. The connector 17 has a locking ring 18, which is arranged such that it can move in a circumferential direction 49 on the connector 17, it being possible for the locking ring 18 to move at least between a securing position shown in FIGS. 5, 6, 8, 11 and 12 and a releasing position shown in FIGS. 7 and 9. The connecting piece 29 has an outer securing groove 30, which runs in a closed manner in the circumferential direction 49. The locking ring 18 has a plurality of locking elements 22, which are arranged distributed in the circumferential direction 49 and are arranged in a radially resilient manner on the locking ring 18. The connector 17 also has a securing ring 26, which runs in a closed manner in the circumferential direction 49. When in the installed state, the locking ring 18 is fixed axially to the connector 17 in a form-fitting manner by the securing ring 26, by means of the locking elements 22. When the connecting piece 29 is in the inserted state and the locking ring 18 is in the securing position, the locking elements 22 engage radially into the securing groove 30 and thereby secure the connecting piece 29 on the connector 17 in the axial direction against unintentionally being pulled out or detached.

The respective locking element 22 has a resilient region 23 and a locking nose 24, the respective locking nose 24 engaging into the securing groove 30 when the connecting piece 29 is in the inserted state and the locking ring 18 is in the securing position. Furthermore, the respective locking nose 24 is arranged on the locking ring 18 in a radially resilient manner by means of the resilient region 23. The connector 17 has a ramp region 39 for each locking element 22, which ramp region interacts with the associated locking element 22 and pushes it radially outwards when the locking ring 18 is moved from the securing position to the releasing position, so that the connecting piece 29 is released from the respective locking element 22 when the locking ring 18 is in the releasing position, since the locking elements 22 are moved out of the securing groove 30. As a result, the connecting piece 29 can be pulled axially out of the connector 17.

The connector 17 has a radial locking window 28 for each locking element 22, which locking window is delimited axially by the securing ring 26 and into which the respective locking element 22 radially engages. At least when the locking ring 18 is in the securing position, the locking elements 22 engage through the respective locking window 28 into the securing groove 30 in the connecting piece 29, as a result of which the locking elements 22 block the connecting piece 29 axially with the connector 17.

Figure 6:
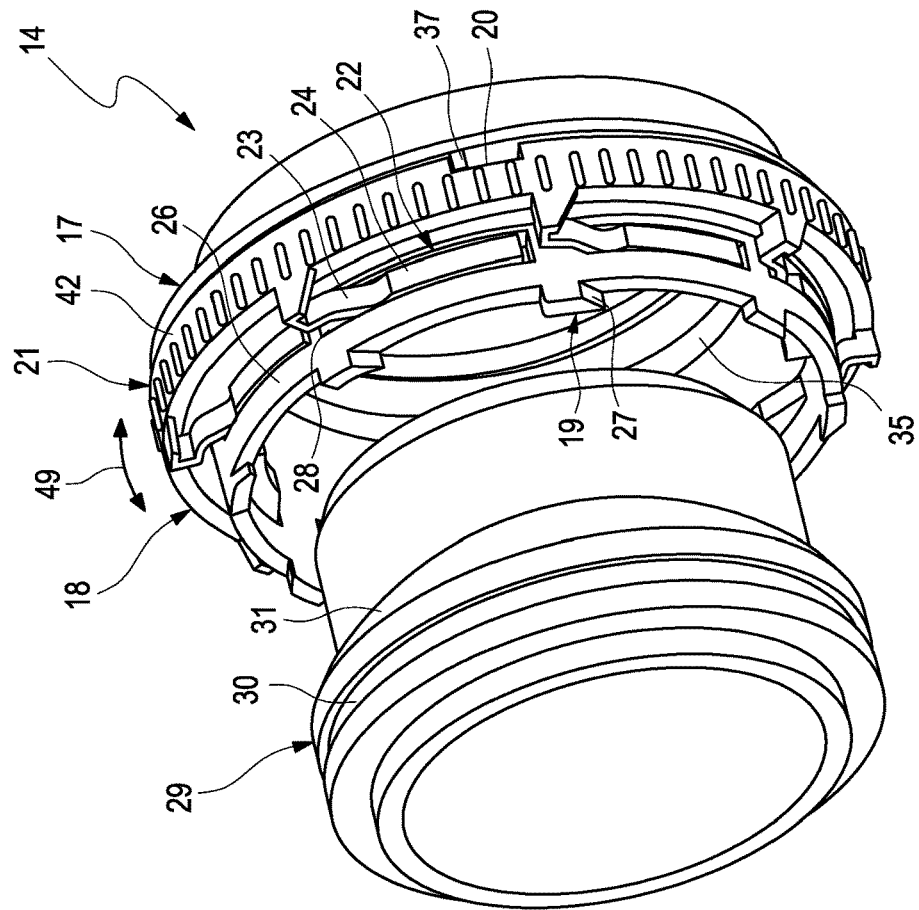
Figure 10:
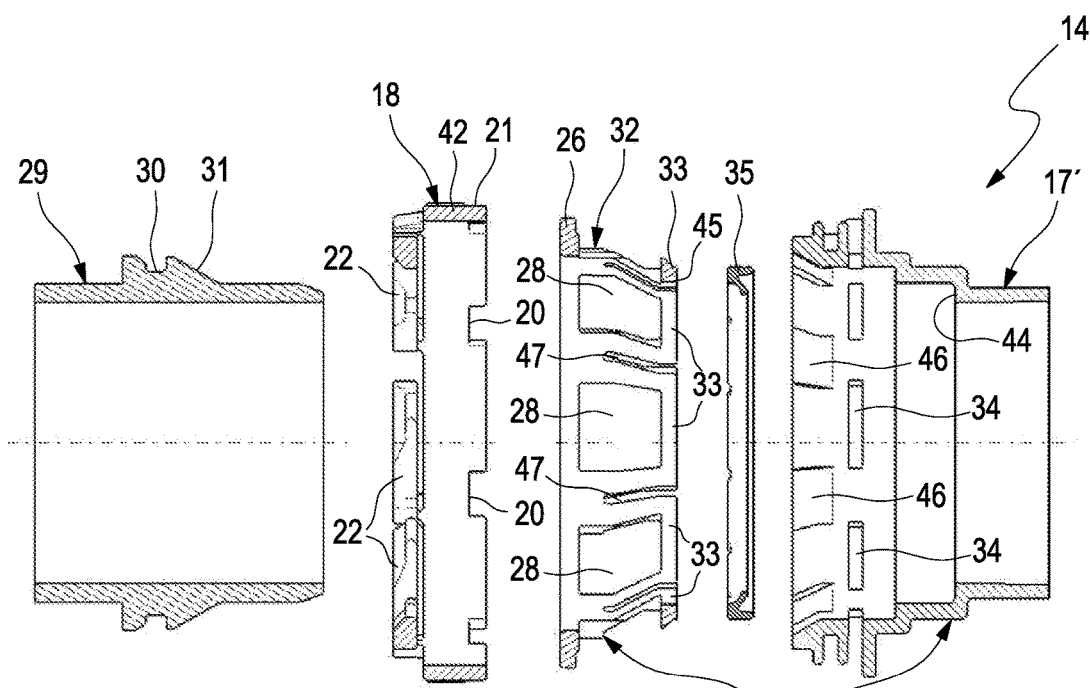
Figure 11:
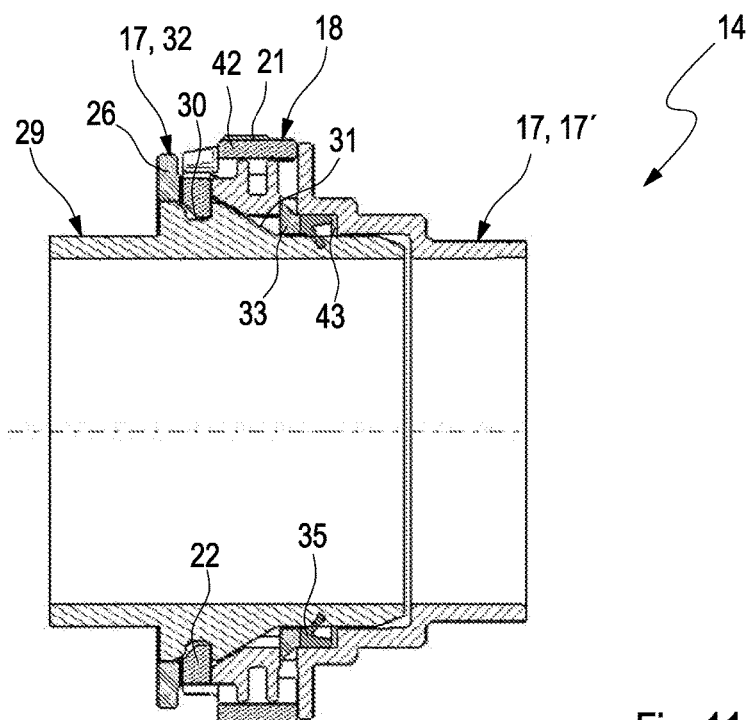

According to FIGS. 6, 10 and 11, the connecting piece 29 has a ramp contour 31, which runs all the way round in the circumferential direction 49 and precedes the securing groove 30 when the connecting piece 29 is inserted. When the connecting piece 29 is inserted, the ramp contour 31 interacts with the locking elements 22 in such a manner that the ramp contour 31 pushes the locking elements 22 radially outwards when the locking ring 18 assumes its securing position. As soon as a predefined insertion depth for the connecting piece 29 in the connector 17 is reached, the locking elements 22 are radially aligned with the securing groove 30, so that they automatically engage radially inwards into the securing groove 30, driven by the spring force.

Figure 12:
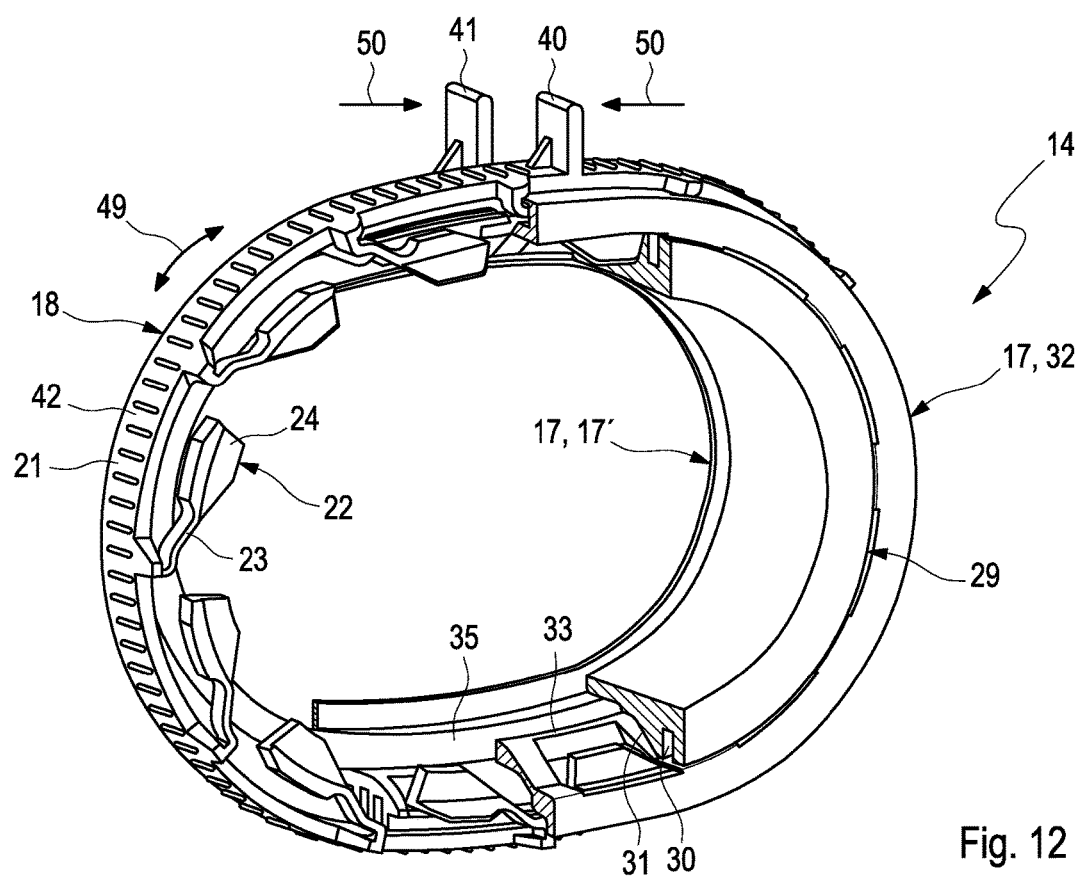

According to FIG. 12, the locking ring 18 can have a radially protruding drive element 40 that can be manually grasped. The connector 17 has a radially protruding abutment element 41 that can be manually grasped. The drive element 40 and the abutment element 41 are arranged adjacently to each other in such a manner that they are arranged offset to each other in the circumferential direction 49, at least when the locking ring 18 is in the securing position. This offset is oriented such that the drive element 40 and the abutment element 41 must be moved towards each other according to arrows 50 in order to move the locking ring 18 into its releasing position. In the embodiment shown in FIG. 12, the drive element 40 and the abutment element 41 form a two-finger operation system for the locking ring 18, so that the coupling device 14 can be detached by the respective fitter using two fingers.

The locking ring 18 is expediently equipped with a strip-shaped ring body 42, which has a flat cross section transverse to the circumferential direction 49. The ring body 42 is thereby comparatively elastic and flexible. The locking elements 22 are then arranged in a resilient manner on the ring body 42, the locking elements 22 expediently adjoining the ring body 42 axially.

According to FIGS. 2 to 9, the connector 17 can have at least one rotation stop 37 on its outer side. Said rotation stop 37 interacts with a receptacle 20 formed on the locking ring 18 in order to limit the mobility of the locking ring 18 relative to the connector 17 between the securing position and the releasing position. The securing position and the releasing position thus each form an end position between which the locking ring 18 can be rotated relative to the connector 17.

In the embodiments of FIGS. 2 to 9, the securing ring 18 is formed integrally on the connector 17. In contrast to this, FIGS. 10 to 12 show other embodiments, in which the connector 17 has a separate securing part 32 and a main body 17', to which the securing part 32 is attached. The securing part 32 has the securing ring 18. In the embodiments shown here, the securing part 32 also has the ramp regions 39, the locking windows 28, the abutment element 41 and the rotation stop 37.

As can be seen in particular in FIGS. 10 and 11, the connector 17 can have a seal receptacle 43 on the radial inside, which accommodates a radial seal 35, which seals off the inserted connecting piece 29 radially from the connector 17. The seal receptacle 43 is delimited radially and axially on one side (on the right in FIGS. 10 and 11) by an annular step 44 formed on the main body 17'. The seal receptacle 43 is also delimited axially on the other side (on the left in FIGS. 10 and 11) by an axial end face 45 of the securing part 32. This simplifies the assembly of the connector 17, since it is now possible to mount the radial seal 35 on the main body 17' before the securing part 32 is attached. The securing part 32 in this case has a plurality of radially resilient snap hooks 33, which are arranged distributed in the circumferential direction 49 and each engage radially outwards into a snap window 34 formed on the main body 17' when in the attached state. To assemble the connector 17, the securing part 32 is thus inserted into the main body 17' and locked thereto by means of the snap hooks 33. A separate snap window 34 is provided for each snap hook 33. Introduction slopes 46, which the main body 17 has for the snap hooks 33, can also be seen in FIG. 10. A separate introduction slope 46 is provided for each snap hook 33. When the securing part 32 is inserted axially, the introduction slopes 46 push the respective snap hooks 33 radially inwards. As can also be seen in FIG. 10, the introduction slopes 46 are arranged offset in the circumferential direction 49 relative to the snap windows 34. In particular, the introduction slopes 46 are each situated approximately centrally between adjacent snap windows 34.

The snap hooks 33 arranged distributed in the circumferential direction 49 each have between them an axially extending slot 47, which separates the snap hooks 33 that are adjacent in the circumferential direction 49 from each other.

FIGS. 2 to 5 show a pre-assembly of the coupling device 14. For the pre-assembly of the coupling device 14, the locking ring 18 is positioned in front of the connector 17 in such a manner that assembly noses 19, which are arranged distributed on the circumference of the connector 17, are axially aligned with the resilient regions 23. Furthermore, the cut-outs 20 are aligned towards the respective rotation stop 37. A separate assembly nose 19 is expediently provided for each locking element 22. The locking ring 18 has a grip region 21, which has a haptic, non-slip grasping face, which runs around in an annular manner and in this case is formed on the ring body 42. As mentioned, a plurality of locking elements 22, which are arranged distributed around the circumference and each have a resilient region 23 and a locking nose 24, is situated on the locking ring 18. In the relaxed state, the locking noses 24 project radially inwards and form an inner part-circle 25. The inner part-circle 25 has a smaller diameter than the grip region 21 and ring body 42.

The securing ring 26 arranged on the connector 17 is arranged behind the assembly noses 19 in the axial direction, that is, in the insertion direction of the connecting piece 29. In the example, the assembly noses 19 protrude axially from the securing ring 26. The assembly noses 19 and the securing ring 26 have the same inner diameter. The outer diameter of the securing ring 26 partially also corresponds to the outer diameter of the assembly noses 19. However, the assembly noses 19 in this case are each equipped with a ramp region 27, which forms an e.g. continuous rise from the inner diameter to the outer diameter. The locking windows 28, through which the locking noses 24 can engage when in the assembled state, adjoin the securing ring 26 in the axial direction, that is, again in the insertion direction of the connecting piece 29.

Figure 3:
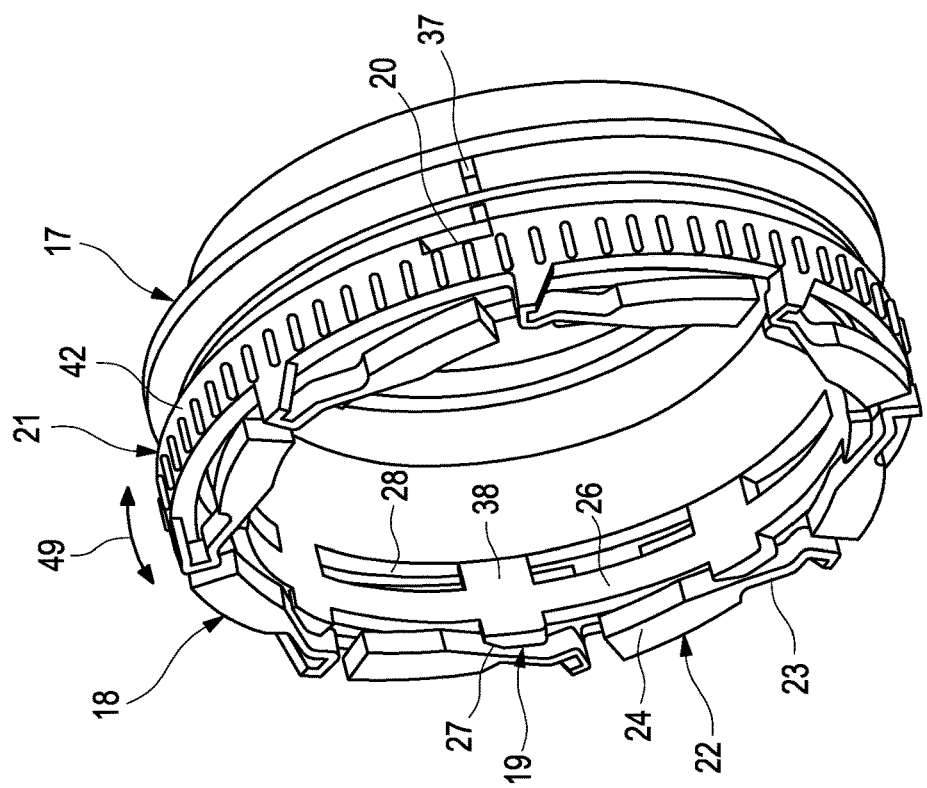
Figure 4:
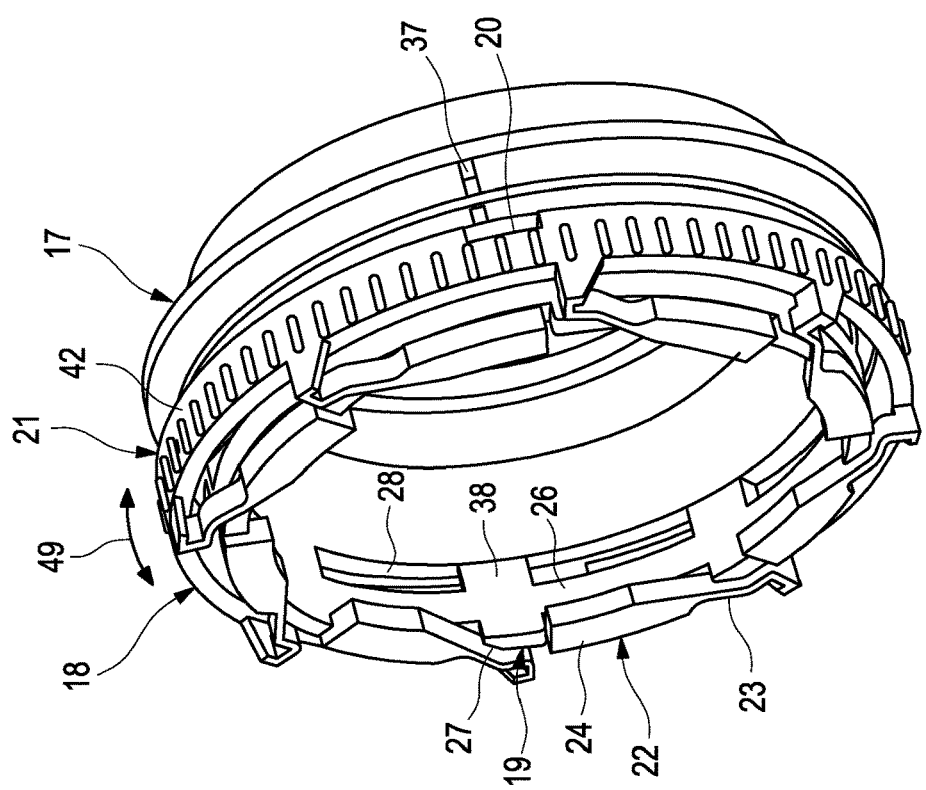
Figure 5:
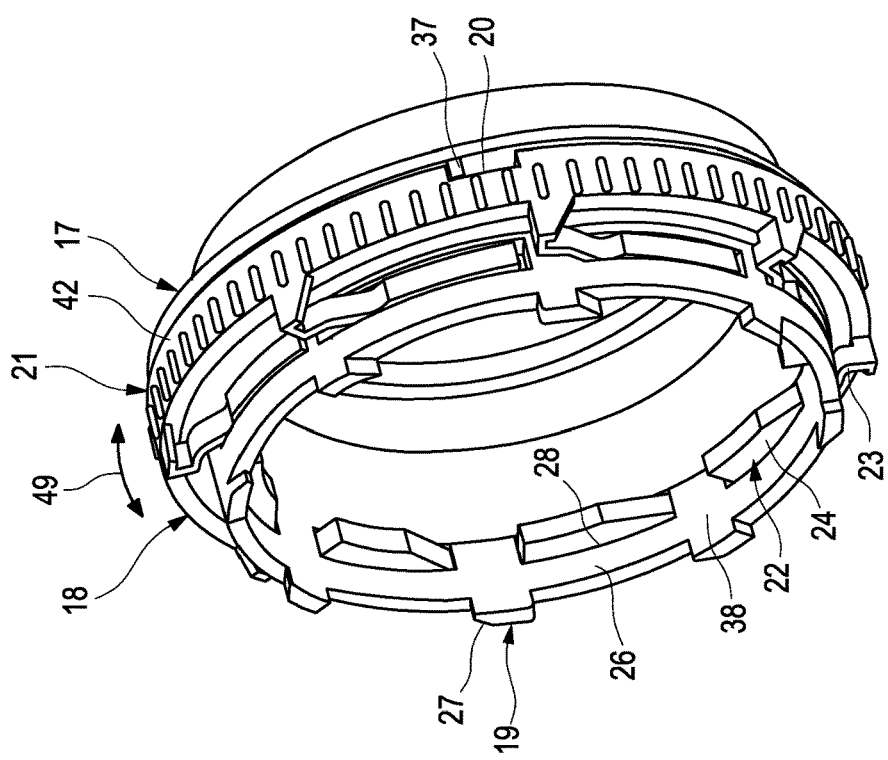
Figure 8:
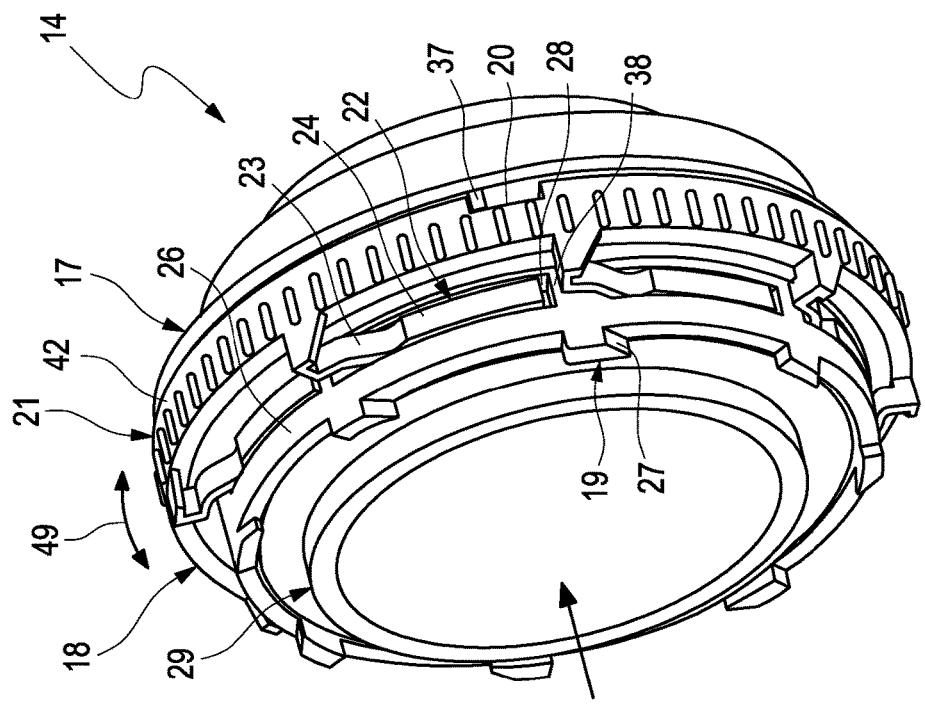

The locking ring 18 placed onto the connector 17 for pre-assembly according to FIG. 3 bears axially against the securing ring 26 with the locking noses 24. For further pre-assembly, the locking ring 18 is rotated anti-clockwise, the locking noses 24 sliding on the ramp regions 27 of the assembly noses 19 and being pressed radially outwards. The locking noses 24 spring to the same diameter of the securing ring 26, as shown in FIG. 4. Then the locking noses 24 can be pushed axially over the securing ring 26. After the locking noses 24 have passed over the securing ring 26, the locking noses 24 can engage into the locking window 28 and then spring radially inwards again. This partially assembled state is shown in FIG. 5.

Figure 7:
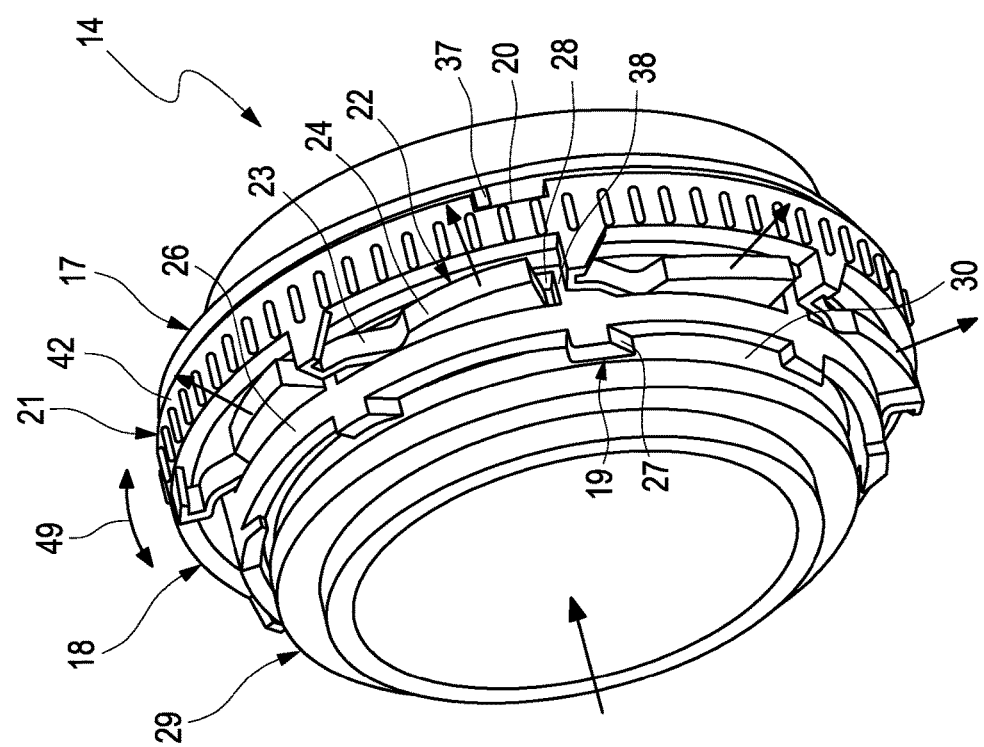

The connecting piece 29 to be connected of the respective component of the fresh air system 10 is then pushed into the partially assembled coupling device 14. As mentioned, the connecting piece 29 can be formed in a materially integral manner on the respective component or line, in this case the clean air line 13, or attached thereto subsequently. Methods such as adhesive bonding, welding or shrink-fitting are suitable for this. As mentioned, the connecting piece 29 has a securing groove 30 on the outside, which runs around in an annular manner and is arranged axially behind the ramp contour 31, which likewise runs around in an annular manner, in the assembly direction. The introduction of the connecting piece 29 into the connector 17 causes the locking noses 24 to slide on the ramp contour 31 and to be pressed radially outwards, which is indicated in FIG. 7 by arrows. The locking noses 24 are displaced radially outwards until they have reached an outermost point. Continued introduction of the connecting piece 29 causes the locking noses 24 then to reach the region of the securing groove 30. The locking noses 24 then lock into the securing groove 30, said locking noses being driven radially inwards by the respective resilient region 23. This produces a form-fitting connection, which prevents unintended axial detachment of the connection between the connecting piece 29 and the connector 17 in the coupling device 14.

FIGS. 10 to 12 show alternative configurations of the coupling device 14 in section or partial section. These configurations differ from the above-mentioned embodiment according to FIGS. 2 to 9 in that the connector 17 is formed in two parts and to this end has the securing part 32 and the main body 17'. This two-part form means that the individual components of the connector 17 can be made geometrically simpler, as a result of which the connector 17 can be produced as an injection-moulded part with simpler dies without undercuts or disintegration cores. The securing ring 26 is formed on the separate securing part 32, which is connected to the main body 17' by means of snap hooks 33. To this end, the snap hooks 33 engage into snap windows 34, which are preferably present in the same number as the snap hooks 33. The snap hooks 33 are connected in an elastically resilient manner to the securing ring 26, play-free assembly taking place in the connector 17 or in the main body 17'. A further advantage of this configuration is the simpler mounting of the radial seal 35, which can be placed in the main body 17' without undercuts. The axial end face 45 of the securing part 32, which closes the seal receptacle 43, is formed by the free ends of the snap hooks 33.

There is also a seal receptacle 43, into which a radial seal 35 is inserted, in the embodiment shown in FIGS. 2 to 9.

The embodiments of FIGS. 10 to 12 further differ from the variant of FIGS. 2 to 9 in that the locking ring 18 can be attached before the securing part 32 is mounted on the main body 17'. For mounting, the locking ring 18 is placed onto the main body 17'. Then the securing part 32 is aligned correspondingly relative to the main body 17 and then pressed axially into the main body 17 and where applicable rotated in the circumferential direction 49 until the snap hooks 33 engage into the snap windows 34. The locking ring 18 is thus arranged on the connector 17 in a captive manner. The different embodiments largely correspond to each other in terms of their other features or properties. Furthermore, it is also possible in the two-part configuration of the connector 17 to mount the locking ring 18 on the securing part 32 in advance, in order to form virtually a pre-assemblable unit, which can then be attached as a unit in the main body 17'.

Figure 9:
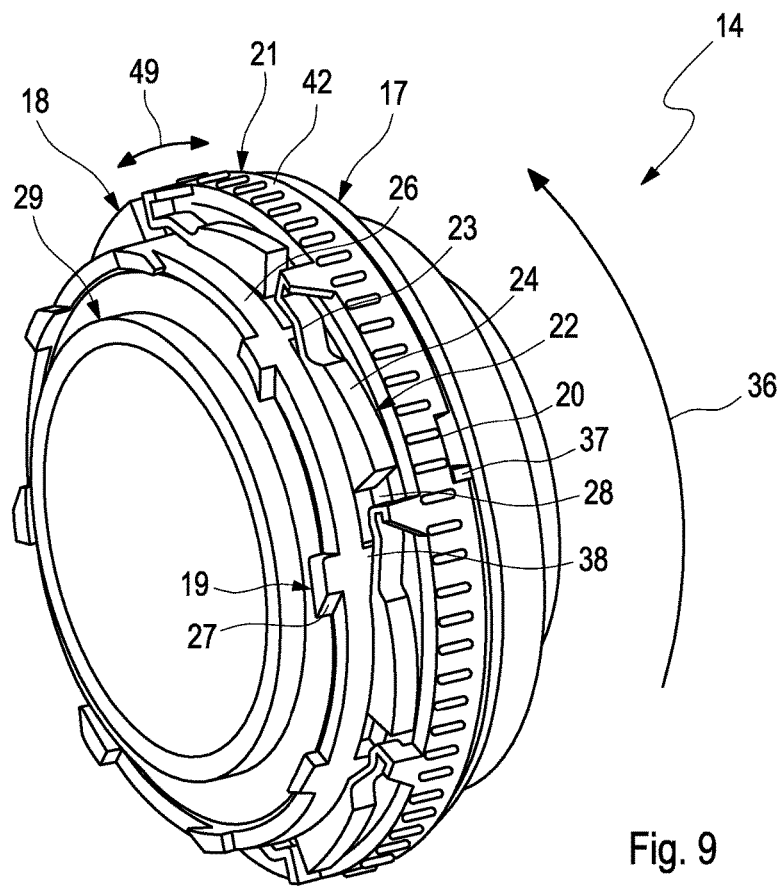

To disassemble the connection or to detach the coupling device 14, the locking ring 18 is rotated in an arrow direction 36 according to FIG. 9 until the locking ring 18 meets the rotation stop 37 with its cut-out 20. The rotation of the locking ring 18 causes the locking noses 24 to slide radially outwards on ribs 38, to which end the ribs 38 are equipped with the ramp regions 39. This movement of the locking noses 24 takes place analogously to the pre-mounting of the locking ring 18 on the connector 17 as described according to FIGS. 2 to 5, only that the ribs 38 are used instead of the assembly noses 19 for the radial movement of the locking noses 24. As mentioned, the ribs 38 also have similar ramp regions 39 to the ramp regions 27 of the assembly noses 19.

In the rotary position shown in FIG. 9, that is, in the releasing position of the locking ring 18, the locking noses 24 no longer project into the securing groove 30. Therefore, the connecting piece 29 can now be pulled axially out of the connector 17.

The invention claimed is:

1. A coupling device for connecting at least two fluid-conducting components, comprising:
   a connector including a securing ring and a radially protruding abutment element,
   a locking ring arranged on the connector and configured to transition in a circumferential direction with respect to a flow axis at least between a securing position and a releasing position, the locking ring comprising a ring body, wherein the ring body includes an outer circumferential surface, and wherein a grip region comprising a non-slip grasping face extends annularly around the outer circumferential surface, and wherein a locking element is disposed on the ring body configured to interact with the securing ring, the locking element being resilient in a radial direction, and further wherein the locking ring further includes a radially protruding drive element,
   a connecting piece arranged axially adjustable with respect to the connector, the connecting piece including an outer securing groove,
   wherein the locking ring is fixed axially to the connector via the locking element engaging the securing ring,
   wherein the locking element engages radially into the securing groove when the locking ring is in the securing position and secures the connecting piece on the connector in the axial direction, and
   wherein the drive element and the abutment element are arranged at least one of adjacently to each other and offset to each other in the circumferential direction, at least when the locking ring is in the securing position, and wherein the drive element and the abutment element are configured to each be manually grasped and moved toward each other in the circumferential direction to move the locking ring from the securing position into the releasing position.

2. The coupling device according to claim 1, wherein the locking element defines a resilient region and a locking nose, wherein the locking nose is radially adjustable on the locking ring via the resilient region and engages into the securing groove when the locking ring is in the securing position.

3. The coupling device according to claim 1, wherein the connector further includes at least one ramp region, which interacts with the locking element of the locking ring and deflects the locking element radially outwards when the locking ring transitions from the securing position to the releasing position, such that the connecting piece is released from the connector when the locking ring is in the releasing position.

4. The coupling device according to claim 1, wherein the connector further includes at least one radial locking window, which is delimited axially by the securing ring, wherein the at least one radial locking window receives the locking element and secures the locking ring to the connector in the securing position.

5. The coupling device according to claim 1, wherein the connecting piece further includes a ramp contour positioned axially between the securing groove and an axial end defined by the connecting piece, wherein the ramp contour deflects the locking element radially outwards when the locking ring transitions from the releasing position to the securing position.

6. The coupling device according to claim 1, wherein the locking ring defines a strip-shaped ring body, the ring body including a flat cross section transverse to the circumferential direction, wherein the locking element is arranged in a resilient manner on the ring body.

7. The coupling device according to claim 1, wherein the connector defines an external surface having at least one rotation stop, which interacts with a receptacle disposed on the locking ring to limit the mobility of the locking ring between the securing position and the releasing position.

8. The coupling device according to claim 1, wherein the connector further includes a main body and a separate securing part attached to a main body, wherein the securing part includes the securing ring.

9. The coupling device according to claim 8, wherein at least one of:
   the securing part further includes at least one ramp region, which deflects with the locking element of the locking ring radially outwards when the locking ring transitions from the securing position to the releasing position,
   the securing part further includes at least one radial locking window, which is delimited axially by the securing ring, and receives the locking element in the radial direction,
   the securing part further includes the radially protruding abutment element configured to adjust the connector in the circumferential direction, and
   the securing part defines an external surface having at least one rotation stop, which interacts with a receptacle disposed on the locking ring to limit the mobility of the locking ring between the securing position and the releasing position.

10. The coupling device according to claim 8, wherein:
    the connector defines an internal surface having a seal receptacle, which accommodates a radial seal, and seals the connecting piece radially to the connector,
    the seal receptacle is delimited radially and axially on one side by an annular step disposed on the main body of the connector, and
    the seal receptacle is delimited axially on the other side by an axial end face of the securing part of the connector.

11. The coupling device according to claim 8, wherein the securing part further includes at least one radially resilient snap hook, which engages radially outwards into a snap window disposed on the main body.

12. The coupling device according to claim 11, wherein the main body further includes an introduction slope for the at least one snap hook, the introduction slope deflecting the at least one snap hook radially inwards when the securing part attaches to the main body, wherein the introduction slope is arranged offset in the circumferential direction relative to the associated snap window.

13. The coupling device according to claim 1, further comprising a fresh air system of an internal combustion engine, and wherein the at least two fluid-conducting components are incorporated into the fresh air system of the internal combustion engine.

14. A fresh air system for an internal combustion engine, comprising:
    at least two components for conducting a gas flow,
    at least one coupling device connecting the at least two components, the at least one coupling device including:
    a connector including a securing ring, the securing ring including at least one radial locking window defining a cross-section delimited axially and circumferentially with respect to a flow axis, the connector further including a radially protruding abutment element;
    a locking ring arranged on the connector and configured to transition in a circumferential direction with respect to the flow axis at least between a securing position and a releasing position, the locking ring comprising a ring body, wherein the ring body includes an outer circumferential surface, and wherein a grip region comprising a non-slip grasping face extends annularly around the outer circumferential surface, and wherein a radially resilient locking element configured to interact with the securing ring is disposed on the ring body, and wherein the locking element radially engages into the at least one locking window of the connector when the locking ring is in the securing position, and further wherein the locking ring further includes a radially protruding drive element;

a connecting piece arranged axially adjustable with respect to the connector, the connecting piece including an outer securing groove configured to receive the locking element;

wherein the locking element radially engages into the securing groove via the at least one locking window when the locking ring is in the securing position and axially fixes the connecting piece to the connector; and wherein the drive element and the abutment element are arranged at least one of adjacently to each other and offset to each other in the circumferential direction, at least when the locking ring is in the securing position, and wherein the drive element and the abutment element are configured to each be manually grasped and moved toward each other in the circumferential direction to move the locking ring from the securing position into the releasing position.

15. The fresh air system according to claim 14, wherein the locking element defines a resilient region and a locking nose, wherein the locking nose is radially adjustable via the resilient region and engages into the securing groove when the locking ring is in the securing position.

16. The fresh air system according to claim 14, wherein the at least one locking window is delimited in the circumferential direction via two circumferentially spaced ribs, wherein one of the two ribs includes a ramp region, which deflects the locking element radially outwards from the securing groove when the locking ring transitions from the securing position to the releasing position such that the connecting piece releases from the connector.

17. The fresh air system according to claim 14, wherein the locking ring defines a strip-shaped ring body, the ring body including a flat cross-section transverse to the circumferential direction, wherein the locking element is arranged on the ring body.

18. The fresh air system according to claim 14, wherein the connector defines an external surface having at least one rotation stop, which interacts with a corresponding receptacle disposed on the locking ring to limit the mobility of the locking ring between the securing position and the releasing position.

19. A coupling device for connecting at least two fluid-conducting components, comprising:

a connector including a main body, a radially protruding abutment element, and a separate securing part attached to the main body, wherein the securing part includes a securing ring and a plurality of snap hooks distributed along the circumferential direction of the securing part separated from each other in the circumferential direction via an axial slot, and wherein the plurality of snap hooks are configured to engage radially outwards into a plurality of snap windows disposed on the main body;

a locking ring arranged on the connector and configured to transition in a circumferential direction with respect to a flow axis at least between a securing position and a releasing position, the locking ring including a radially protruding drive element and a locking element configured to interact with the securing ring, the locking element being resilient in a radial direction;

a connecting piece arranged axially adjustable with respect to the connector, the connecting piece including an outer securing groove;

wherein the locking ring is fixed axially to the connector via the locking element engaging the securing ring;

wherein the locking element engages radially into the securing groove when the locking ring is in the securing position and secures the connecting piece on the connector in the axial direction; and wherein the drive element and the abutment element are arranged at least one of adjacently to each other and offset to each other in the circumferential direction, at least when the locking ring is in the securing position, and wherein the drive element and the abutment element are configured to each be manually grasped and moved toward each other in the circumferential direction to move the locking ring from the securing position into the releasing position.

\* \* \* \* \*